United States Patent
Nagai et al.

(10) Patent No.: US 6,457,693 B1
(45) Date of Patent: Oct. 1, 2002

(54) SUCTION PAD

(75) Inventors: Shigekazu Nagai, Adachi-ku; Masayoshi Yamamoto, Koshigaya; Yasuhisa Ueki, Mitsukaido, all of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/689,850

(22) Filed: Oct. 13, 2000

(30) Foreign Application Priority Data

Oct. 15, 1999 (JP) ............................................ 11-294612

(51) Int. Cl.[7] ................................................ F16B 47/00
(52) U.S. Cl. ...................................... 248/363; 248/205.5
(58) Field of Search ............................. 248/363, 205.5; 362/397

(56) References Cited

U.S. PATENT DOCUMENTS 6,249,932 B1 * 6/2001 Chu et al. ..................... 15/345

FOREIGN PATENT DOCUMENTS

JP 62-172582 11/1987

* cited by examiner

*Primary Examiner*—Leslie A. Braun
*Assistant Examiner*—Ingrid Weinhold
(74) *Attorney, Agent, or Firm*—Paul A. Guss

(57) ABSTRACT

A suction pad for attracting a workpiece having an opening at is central portion (for example, CD-R) comprises a holding section having engaging members formed in an integrated manner, and an attracting section for attracting the workpiece, wherein the attracting section includes support members which are defined therein with chambers and aspiration holes communicating with the chambers and which are provided with expansion and contraction mechanisms, and an annular attracting member having a groove which is formed on an attracting surface for attracting the workpiece, the aspiration holes communicate with the groove, and the holding section and the attracting section are integrated into one unit by the aid of disengagement-preventive mechanisms.

11 Claims, 4 Drawing Sheets

SUCTION PAD

BACKGROUND OF THE INVENTION

1. Field of the Invention

The present invention relates to a suction pad for attracting an annular workpiece having an opening at its central portion, for example, a compact disk-recordable (CD-R).

2. Description of the Related Art

In general, a vacuum-attracting apparatus, which is based on the use of a suction pad, is adopted as a transport means for an annular workpiece (hereinafter simply referred to as "workpiece") having an opening at its central portion. It is known that the suction pad, which is used for the vacuum-attracting apparatus, is constructed, for example, as disclosed in Japanese Laid-Open Utility Model Publication No. 62-172582.

The suction pad includes an inner seal member, an outer seal member for surrounding the inner seal member, and a pad-supporting member to be fitted to the outer seal member. A vacuum-attracting groove, which is formed between the inner seal member and the outer seal member, communicates with a vacuum-attracting hole which is formed in the pad-supporting member. An aspirator is operated to attract the workpiece by the aid of the vacuum-attracting groove and the vacuum-attracting hole. Accordingly, the workpiece is attracted to the inner seal member and the outer seal member.

However, the suction pad concerning the conventional technique described above involves the following drawback. That is, for example, when the workpiece has any strain or warpage, it is impossible to attract and hold the workpiece horizontally. Therefore, the workpiece is transported in a state of being inclined. An inconvenience arises such that a large number of workpieces cannot be stacked at a correct position or in a correct attitude on a workpiece-stacking apparatus.

When the workpiece is repeatedly transported many times, then the inner seal member and the outer seal member, which serve as the attracting section for the workpiece, are abraded, and it is necessary to exchange the suction pad with new one. However, in the case of the suction pad described above, the outer seal member and the pad-supporting member are tightly fitted and integrated into one unit. Therefore, an inconvenience arises such that the exchange operation for the outer seal member is complicated.

SUMMARY OF THE INVENTION

A general object of the present invention is to provide a suction pad which makes it possible to attract and hold a workpiece horizontally and stack the workpiece at a correct position and in a correct attitude on a workpiece-stacking apparatus, even when the workpiece has any strain or warpage.

A principal object of the present invention is to provide a suction pad which makes it possible to easily exchange a workpiece-attracting section separately from a holding section.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
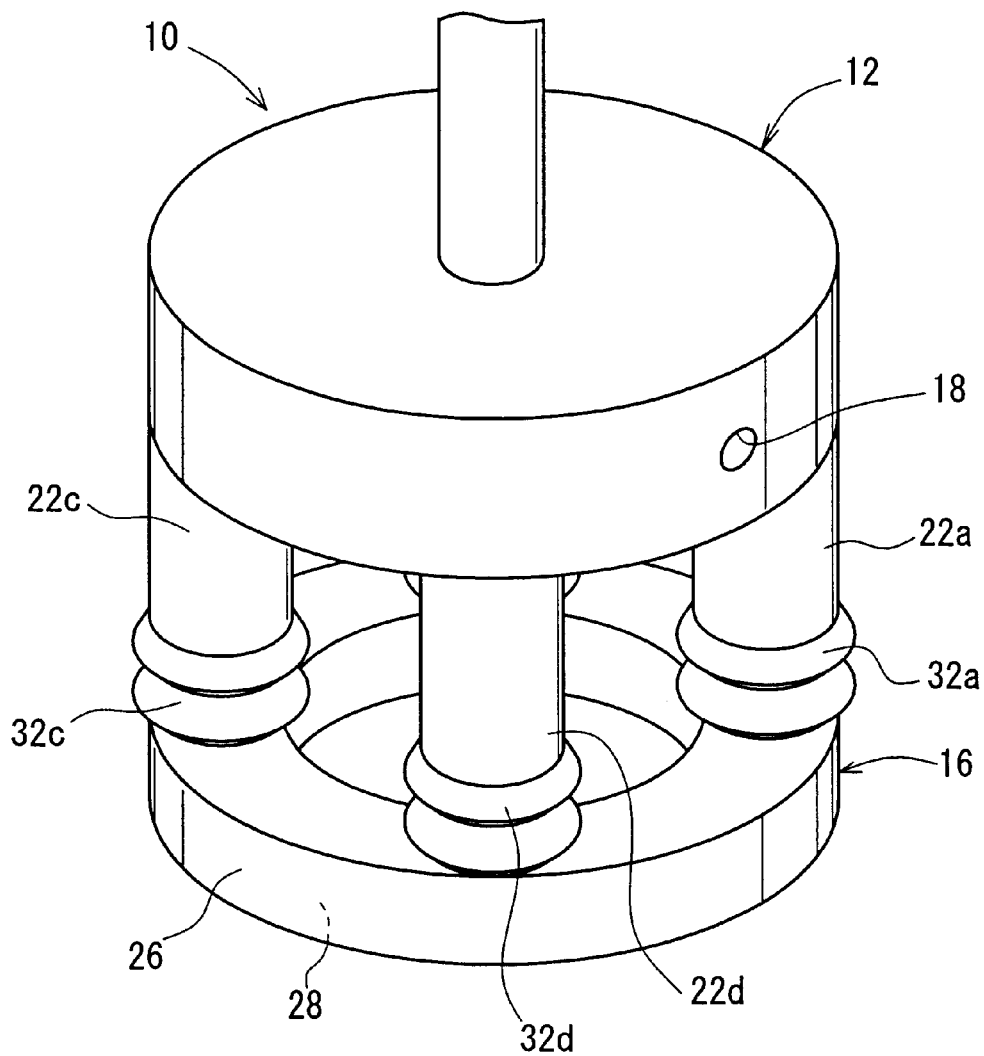
FIG. 1 shows a perspective view illustrating a suction pad according to an embodiment of the present invention.
Figure 2:
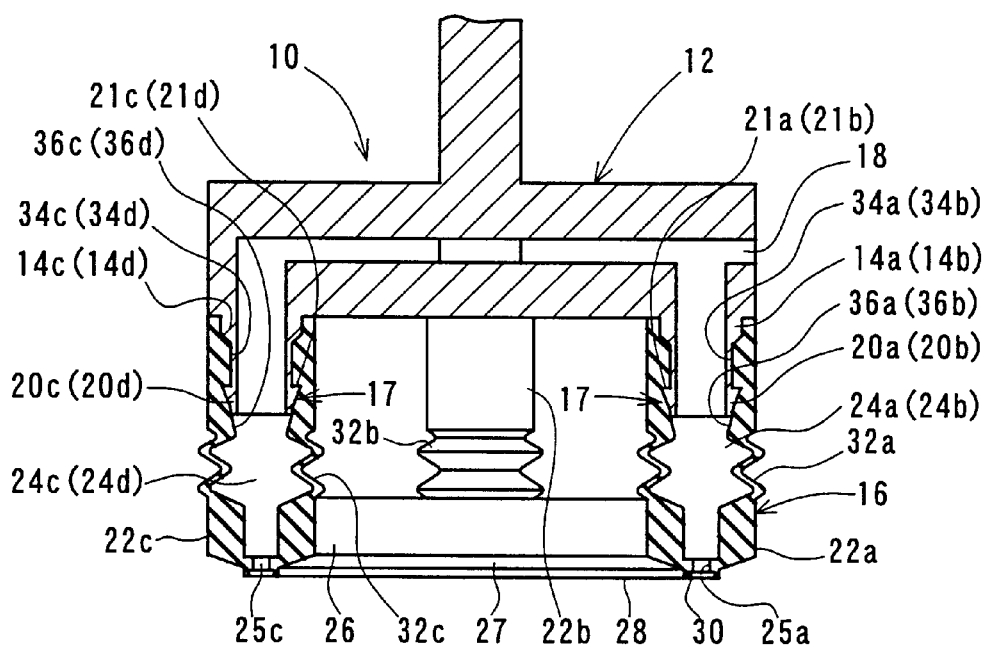
FIG. 2 shows a vertical sectional view illustrating the suction pad according to the embodiment of the present invention (vertical sectional view illustrating the suction pad, taken along a line II—II shown in FIG. 3)

A suction pad 10 according to an embodiment of the present invention is provided in order to attract an annular workpiece W having an opening at its central portion (for example, compact disk-recordable (CD-R)). As shown in FIGS. 1 and 2, the suction pad 10 basically comprises a holding section 12 made of metal having four engaging members 14a to 14d formed integrally in parallel at forward end portions, and an attracting section 16 made of rubber for attracting the workpiece W. The holding section 12 and the attracting section 16 are fastened to one another by the aid of a disengagement-preventive mechanism 17 as described later on.

The holding section 12 is held by an unillustrated robot arm, and it is swingable in accordance with the rotary action of the robot arm. Accordingly, the workpiece W, which is attracted by the attracting section 16, is transported.

As shown in FIGS. 1 and 2, an aspiration passage 18, which communicates with an unillustrated aspirator, is defined at the inside of the holding section 12. When the aspirator is operated, a negative pressure is generated at the inside of the aspiration passage 18.

The air flows in the aspiration passage 18 in a direction to attract the workpiece W to the attracting section 16.

As shown in FIG. 2, each of forward end portions 20a to 20d of the engaging members 14a to 14d is formed to have a substantially wedge-shaped configuration. The circumferential surface, which extends upwardly from a flat surface 21a to 21d formed at the forward end portion 20a to 20d, is constructed as a vertical surface provided with a tapered surface. The forward end portion 20a to 20d is one of the constitutive components of the disengagement-preventive mechanism 17 as described later on.

Figure 3:
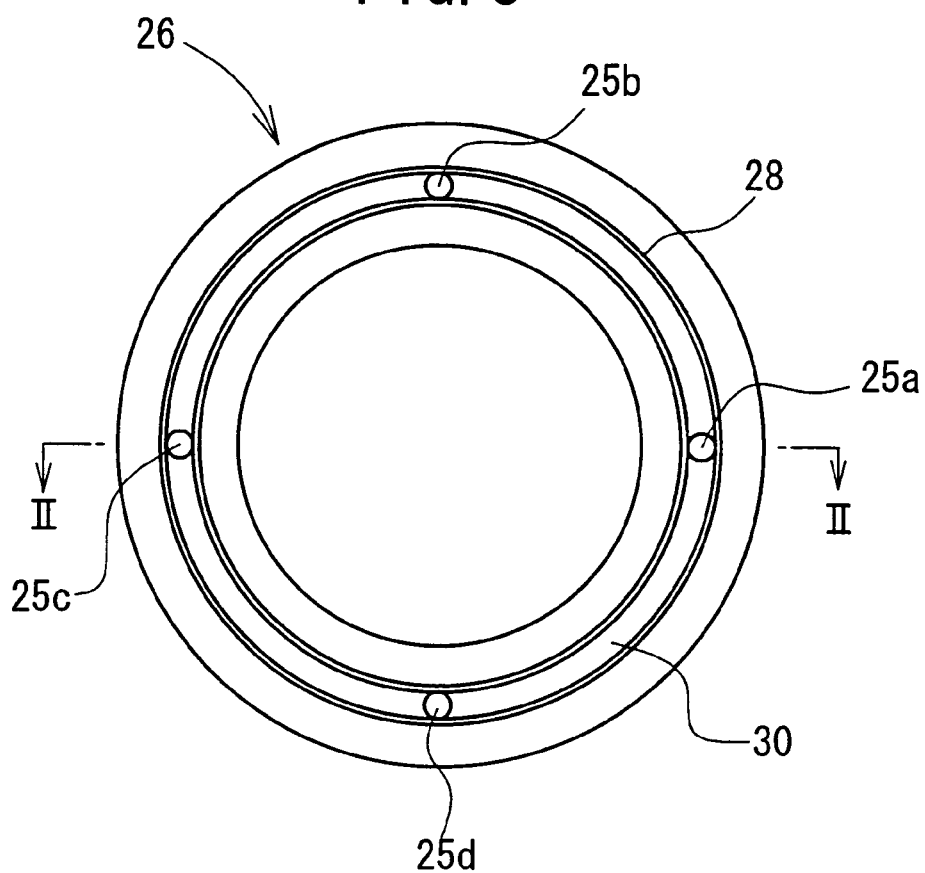
FIG. 3 shows a bottom view illustrating the suction pad according to the embodiment of the present invention.

As shown in FIGS. 1 to 3, the attracting section 16 includes four support members 22a to 22d having chambers 24a to 24d and aspiration holes 25a to 25d communicating with the chambers 24a to 24d which are formed in parallel at the inside, and an attracting member 26 having an annular groove 30 formed on an attracting surface 28 to make abutment against the workpiece W. An annular tapered surface 27 is provided at the forward end of the attracting member 26.

A bellows 32a to 32d, which has a cross section formed to have a smooth ridge-shaped configuration to make the support members 22a to 22d be expandable and contractible, is provided for each of the support members 22a to 22d. The aspiration holes 25a to 25d communicate with the groove 30. The chambers 24a to 24d, the aspiration holes 25a to 25d, and the groove 30 serve as passages for the air aspirated by the unillustrated aspirator.

The attracting member 26 and the respective support members 22a to 22d provided with the bellows 32a to 32d are integrally formed, for example, by injecting heated and melted rubber into a mold subjected to the blast treatment by using an unillustrated injection molding machine.

In the present invention, a desired material can be selected for the attracting section 16 depending on the workpiece W to be attracted. For example, when the workpiece W to be attracted is made of metal, it is preferable to use the attracting section 16 made of, for example, rubber or resin (polytetrafluoroethylene (PTFE), conductive polytetrafluoroethylene (PTFE), or high density polyethylene (HDPE) (high molecular weight polyethylene)). When the workpiece W to be attracted is made of rubber, it is preferable to use the attracting section 16 in which the support members 22a to 22d are made of rubber and the attracting member 26 is made of metal.

Accordingly, when the workpiece W is disengaged from the attracting section 16, the workpiece W can be disengaged in a well-suited manner without allowing the workpiece W to remain at the attracting section 16.

A circumscribing groove 36a to 36d, which has a substantially triangular cross section, is formed on each of inner circumferential surfaces 34a to 34d of the support members 22a to 22d. The circumscribing grooves 36a to 36d are fastened to the respective forward end portions 20a to 20d formed to have the substantially wedge-shaped configuration, of the engaging members 14a to 14d. Accordingly, the attracting section 16 is prevented from disengagement from the holding section 12 (see FIG. 2). Therefore, the disengagement-preventive mechanism 17 is constructed by the forward end portion 20a to 20d and the circumscribing groove 36a to 36d.

When the workpiece W is repeatedly transported many times, then the attracting section 16 made of rubber for attracting the workpiece W is abraded, and it is necessary to exchange the attracting section 16. However, in the embodiment of the present invention, the holding section 12 made of metal is fastened to the attracting section 16 made of rubber. Therefore, the attracting section 16 can be easily disengaged from the holding section 12 owing to the elasticity of the attracting section 16. Thus, it is easy to perform the exchange operation.

The suction pad 10 according to the embodiment of the present invention is basically constructed as described above. Next, its function and effect will be explained.

At first, the attracting surface 28 of the attracting member 26, which constitutes the attracting section 16, is allowed to abut against the workpiece W. Subsequently, the unillustrated aspirator is operated. Accordingly, the air is allowed to flow toward the aspiration passage 18 formed in each of the engaging members 14a to 14d via the aspiration holes 25a to 25d and the chambers 24a to 24d defined at the inside of the respective support members 22a to 22d, from the groove 30 provided on the attracting surface 28 of the attracting member 26. Therefore, the negative pressure is generated at the inside of the support members 22a to 22d, and thus the workpiece W is attracted by the attracting member 26.

Figure 4:
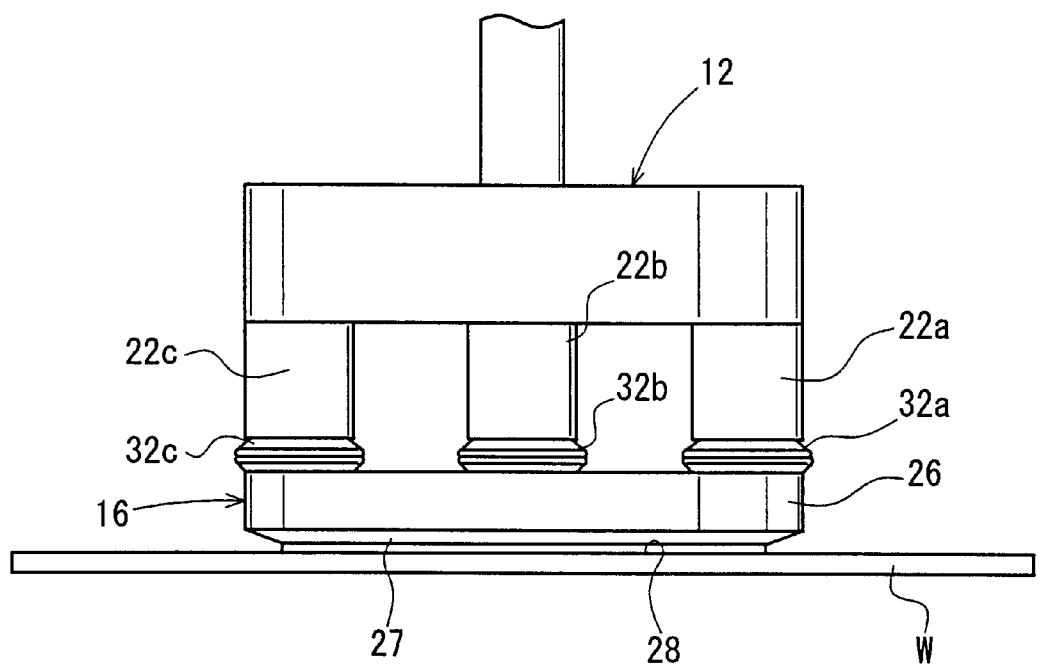
FIG. 4 shows a side view illustrating a state in which a workpiece is attracted by the suction pad according to the embodiment of the present invention.

After that, as shown in FIG. 4, the support members 22a to 22d are pressed against the workpiece W until the bellows 32a to 32d, which are provided for the support members 22a to 22d, are contracted. At this time, even when the workpiece W has any strain or warpage, the workpiece W can be attracted and held horizontally, owing to the function of the bellows 32a to 32d.

When the workpiece W is attracted, then the unillustrated robot arm is rotated, and the holding section 12 is allowed to be swingable. Thus, the workpiece W is transported to the workpiece-stacking apparatus (not shown). During this process, the workpiece W can be reliably transported in the correct attitude without inclining the workpiece W during the transport, because the holding section 12 and the attracting section 16 are tightly fixed to one another by the aid of the disengagement-preventive mechanisms 17.

When the workpiece is transported to the workpiece-stacking apparatus, then the operation of the unillustrated aspirator is stopped, and the support members 22a to 22d are released from the negative pressure state at the inside. As a result, the workpiece is disengaged from the suction pad 10. The workpiece W is stacked on the workpiece-stacking apparatus at the correct position or in the correct attitude.

What is claimed is:

1. A suction pad for attracting a workpiece, comprising:
   a holding section having a plurality of engaging members formed in an integrated manner;
   an attracting section for attracting said workpiece, wherein said attracting section includes support members which are defined therein with chambers and aspiration holes communicating with said chambers and which are provided with expansion and contraction mechanisms, and an annular attracting member having a groove which is formed on an attracting surface for attracting said workpiece, said aspiration holes communicating with said groove; and
   disengagement-preventative mechanisms provided on end portions of each of said engaging members, each of said disengagement-preventative mechanisms comprising a substantially wedge-shaped configuration, and a circumscribing groove having a substantially triangular cross section formed on an inner circumferential surface of said support member,
   wherein said holding section and said attracting section are fastened to one another by the aid of said disengagement-preventative mechanisms.

2. The suction pad according to claim 1, wherein said expansion and contraction mechanism is a bellows having a cross section formed to have a ridge-shaped configuration.

3. The suction pad according to claim 1, wherein an aspiration passage, which communicates with an aspirator, is defined at the inside of said holding section.

4. The suction pad according to claim 1, wherein said holding section is composed of a metal material.

5. The suction pad according to claim 1, wherein four of said engaging members are formed in parallel.

6. The suction pad according to claim 1, wherein said support members and said attracting member are formed in an integrated manner by means of injection molding.

7. The suction pad according to claim 1, wherein four of said support members are formed in parallel.

8. The suction pad according to claim 1, wherein said support members and said attracting member are composed of a rubber material.

9. The suction pad according to claim 1, wherein said support members and said attracting member are made of polytetrafluoroethylene, conductive polytetrafluoroethylene, or high density polyethylene or high molecular weight polyethylene.

10. The suction pad according to claim 1, wherein said support members are composed of a rubber material, and said attracting member is composed of a metal material.

11. The suction pad according to claim 1, wherein said groove in said annular attracting member is an annular groove.

* * * * *